Nov. 14, 1950  R. R. CAUBLE  2,529,797

MOWER WITH YIELDINGLY RETRACTABLE KNIVES

Filed June 7, 1946

INVENTOR,
RAYMOND R. CAUBLE,
By Herbert A. Minturn,
ATTORNEY.

Patented Nov. 14, 1950

2,529,797

UNITED STATES PATENT OFFICE 2,529,797

MOWER WITH YIELDINGLY RETRACTABLE KNIVES

Raymond R. Cauble, Indianapolis, Ind.

Application June 7, 1946, Serial No. 675,059

2 Claims. (Cl. 56—295)

This invention relates to cutting means particularly adapted to be used in cutting grass, trash, and the like, thereby lending itself particularly for use in farm operations. In many instances, when weeds or grass are to be cut, there may be obstructions concealed within the grass, such as rocks, stumps, or other rigid articles. The invention primarily has to do with the provision of allowing the cutting elements to swing back out of the normal cutting path when such obstacles are encountered.

The primary object of the invention is to provide means above indicated wherein separate cutting elements may be shiftably mounted to be extended normally by centrifugal force to permit yielding retractment should any one or all of the cutting elements strike an object, whereby undue damage is avoided not only of the cutting elements, but also of the carrier upon which the cutting elements may be mounted. Furthermore, the driving mechanism is also protected from harm through use of the invention. These and many other objects and advantages of the invention, including the unusual simplicity and unique combinations of the various elements as set forth in the appended claims, will become apparent to those versed in the art in the following description of the invention, in which Fig. 1 is a view in top plan of a structure embodying the invention;

Like characters of reference indicate like parts throughout the several views in the drawing.

Figure 1:
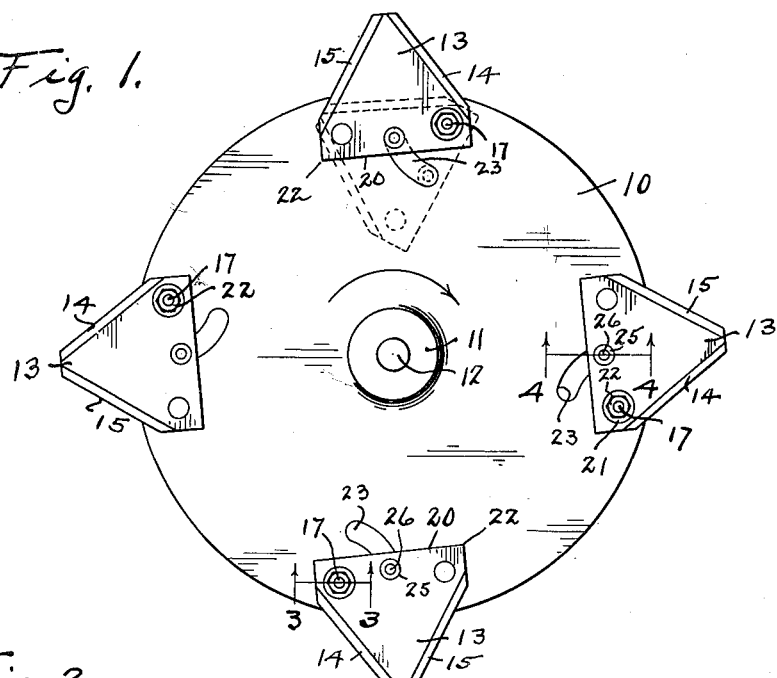
Figure 2:
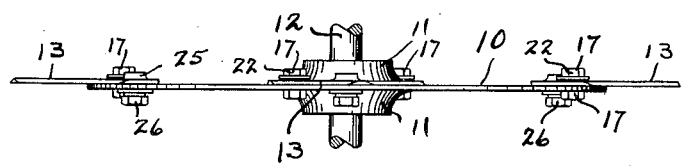
Fig. 2 is a view in side elevation.

In the present form of the invention, I employ a circular disk 10, preferably having a hub 11 so that the disk 10 may be rotated about its center axis such as by means of a shaft 12 engaging the hub 11. At spaced intervals around the disk 10 is mounted a plurality of cutting sections 13, herein shown as four in number. In the present showing, these sections have essentially the same contour as that of customarily employed sections on a reciprocating sickle in farm mowers. That is, each section 13 is provided with a beveled edge portion 14 on one side, and a beveled portion 15 on the other side, both edges tending to converge toward a center point in the outer end of the section.

Figure 3:
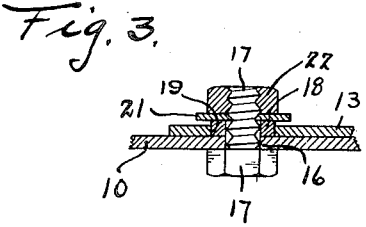
Fig. 3 is an enlarged sectional view on the line 3—3 in Fig. 1.

The disk 10, Fig. 3, is provided with a hole 16 therethrough adjacent the peripheral edge for each of the sections 13 provided. Through this hole 16 is passed a bolt 17 to have a bearing sleeve 18 therearound which has, by its outer surface, a running fit through a hole 19 provided to one side of the section 13 near its base edge 20. A washer 21 is placed over the end of the sleeve 18 and then a nut 22 screwthreadedly engages the bolt 17 to hold the sleeve 18 in fixed, compressive engagement by its end against the face of the disk 10. There is sufficient clearance between the under side of the washer 21 and the top face of the disk 10 to permit free rotation of the section 13 about the sleeve 18.

As indicated, the bolt 17 passes through the section 13 in each instance, not only adjacent the base edge 20, but also adjacent one side of the section. By reason of this particular type of mounting, the center of mass of the section 13, upon rotation of the disk 10, would tend to cause the section 13 to travel outwardly to have the corner 22a, in the present proportions indicated in Fig. 1, travel outwardly past the edge of the disk 10. To control the degree of rotation of the section 13 about the sleeve 18, there is provided an arcuate slot 23 adjacent each disk hole 16, the two sides of the slot 23 having their radii centered on the axis of the bolt 17.

Figure 4:
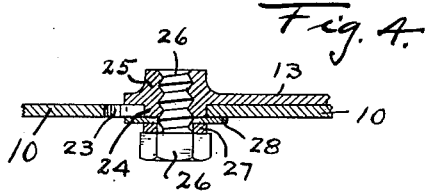
Fig. 4 is an enlarged sectional view on the line 4—4 in Fig. 1.

Each section 13, Fig. 4, is provided with a boss 24 of a diameter to have a sliding fit between two sides of the slot 23 and extend from the under side of the section 13 a distance to have its lower face terminate in the plane of the under surface of the disk 10. The section 13 preferably is built up on the upper side by a boss 25 so as to provide ample length to receive the cap screw 26 screwthreadedly therein. This cap screw 26 carries a lock washer 27 bearing against a plain washer 28 that has sufficient diameter to extend across the slot 23 to bear on both sides thereof. The cap screw 26 continues on to screwthreadedly engage through the boss 24 and preferably on through the boss 25. The lock washer 27, when drawn against the plain washer 28, tends to hold the washer 28 in yielding frictional engagement against the under face of the disk 10 on each side of the slot 23. However, this pressure so exerted is made to be such that when the disk 10 is brought up to its normal operating speed, the section 13 in each instance will assume the individual positions as indicated in Fig. 1 wherein the boss 24 is at the outer end of the slot 23.

In operation, when the disk 10 is rotating rapidly, the leading edges of the sections 13, in the present instance, the edges 14, will cut through the grass and weeds, and the like, as the disk 10 may be advanced. Should, however, a section 13 strike a stump, for example, the disk 10 may continue to rotate but the section 13 striking that obstruction will be pulled back to turn about the bolt 17 and allow the boss 24 to travel around in the slot 23 until the edge 14 is completely within the confines of the peripheral edge of the disk 10, as indicated by the dash lines in Fig. 1. Of course, the degree of retraction of the section 13 will depend upon how much the disk 10 is advanced toward that obstruction. Then, upon pulling the disk back away from the obstruction, the section 13 or all of the sections 13, as may be the case, which have been shifted back over the face of the disk 10, will again return to their normal cutting positions under the centrifugal action set up by the speed of the disk 10.

The sections 13 may be mounted on either the top face or the under face of the disk 10 simply by detaching the bolt 17, removing the section 13 in each instance, and then applying it up against the under face of the disk 10 to have the boss 24 enter the slot 23 again and the bolt 17 enter through the disk hole 16 or in the same manner as above indicated. This will permit use of the other cutting edge 15 without changing the direction of rotation of the disk 10.

While I have herein shown and described my invention in one particular form, it is obvious that structural changes may be employed without departing from the spirit of the invention, and I therefore do not desire to be limited to the precise form beyond the limitations as may be imposed by the following claims.

I claim:

1. In a rotary cutter, a rotatable disk; a cutter section; means for pivotally attaching the section to said disk whereby a portion of the section may extend beyond the periphery of said disk; said attaching means engaging said section to one side of the central axis of the section, the center of mass being on said axis; whereby the weight distribution of the section thereabout is such as to cause the section to swing on said pivot means under centrifugal action induced by rotation of said disk to provide such extension beyond the disk; said attaching means being fixed in location in respect to both said disk and said section; and stop means limiting said swinging; said stop means comprising a pair of spaced apart abutments on said disk, and an abutment on said section between said pivot means and said cutting edge to swing between said disk abutments in an arc, the center of the radius of curvature of which is at said attaching means.

2. In a rotary cutter, a rotatable disk; a cutter section; means for pivotally attaching the section to said disk whereby a portion of the section may extend beyond the periphery of said disk; said attaching means engaging said section to one side of the central axis of the section, the center of mass being on said axis; whereby the weight distribution of the section thereabout is such as to cause the section to swing on said pivot means under centrifugal action induced by rotation of said disk to provide such extension beyond the disk; said attaching means being fixed in location in respect to both said disk and said section; and stop means limiting said swinging; said stop means comprising a pair of spaced apart abutments on said disk, and an abutment on said section between said pivot means and said cutting edge to swing between said disk abutments in an arc, the center of the radius of curvature of which is at said attaching means; said disk abutments consisting of ends of a slot; and bolt means compressively interengaging said disk and said section yieldingly frictionally swinging resisting swinging of said section.

RAYMOND R. CAUBLE.

REFERENCES CITED

The following references are of record in the file of this patent:

UNITED STATES PATENTS

| Number | Name | Date |
|---|---|---|
| 498,533 | Clousing | May 30, 1893 |
| 1,868,918 | Schenk | July 26, 1932 |
| 2,038,284 | Hansen | Apr. 21, 1936 |
| 2,115,265 | Jennett | Apr. 26, 1938 |